July 30, 1929.  G. A. VAUGHN  1,722,610
COMBINED DOUGH MOLDER AND DIVIDER
Filed Sept. 9, 1925  2 Sheets-Sheet 2
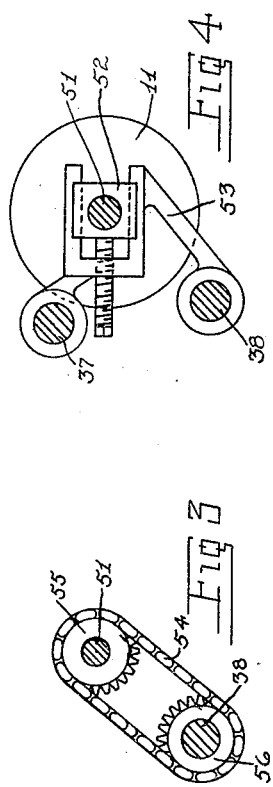
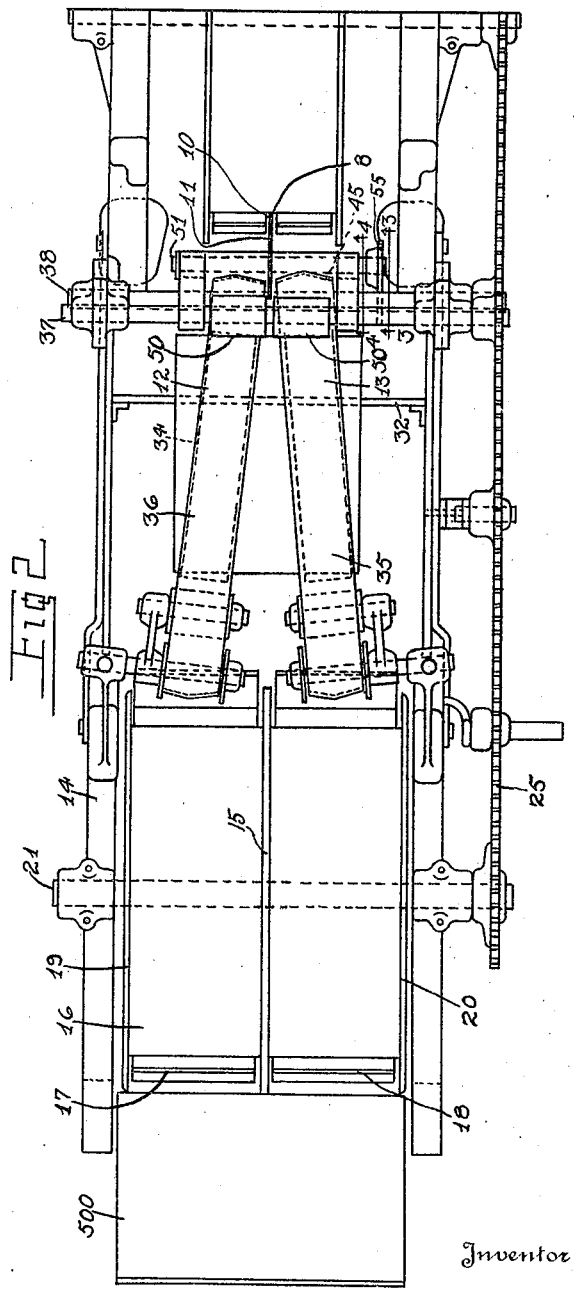
Inventor
GEORGE A. VAUGHN.
By Murray and Zugelter
Attorneys Patented July 30, 1929.

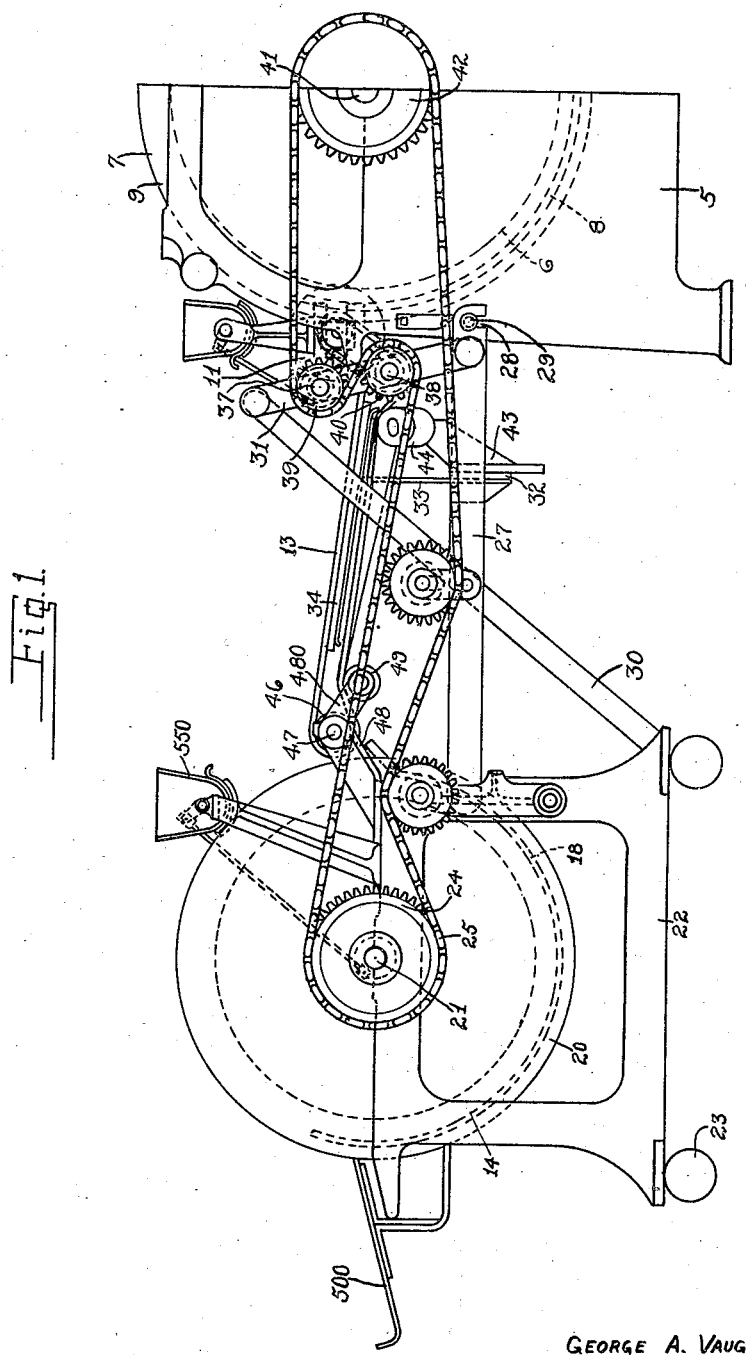

1,722,610

UNITED STATES PATENT OFFICE.

GEORGE A. VAUGHN, OF BERWICK, PENNSYLVANIA.

COMBINED DOUGH MOLDER AND DIVIDER.

Application filed September 9, 1925. Serial No. 55,362.

An object of my invention is to provide a device for effecting molding and dividing of dough.

Another object of my invention is to provide a simple and efficient device for the purpose stated.

These and other objects are attained by the means described herein and disclosed in the accompanying drawings, in which:

Fig. 1 is a side elevation of a device embodying my invention.

Fig. 2 is a plan view of the device shown in Fig. 1.

Fig. 3 is an enlarged sectional view on line 3—3 of Fig. 2.

Fig. 4 is an enlarged sectional view on line 4—4 of Fig. 2.

The molder 5, a portion only of which is shown, may be of any suitable type, for example as shown in the patent to C. A. Thomson, No. 701,646. In devices of this kind an elongated roll of dough is moved upwardly between the circumference 6 of the drum 7 and a curling or pressure board 8 carried by the molder 5. A peripheral flange such as 9 is formed at the opposite sides of the drum. The pressure board 8 is mounted to yieldingly move away from the circumference 6 to permit the dough to roll between the board and the drum 7 as the drum revolves, thereby rotatably actuating the mass of dough. The foregoing structure is old. As shown herein the pressure board 8 is provided with a slot 10 adjacent its upper and rear end and a circular cutting disc 11 extends into this slot and serves to divide the roll of dough as such roll of dough is moved upwardly as previously explained. The severed sections of the dough are then discharged above the upper edges of the pressure board 8 and fall upon belts 12 and 13 that carry said severed lumps of dough to a multiple molding device 14. The multiple molding device 14 is substantially identical with the device 5 except that a central annular rib 15 is provided upon the drum 16 and a pair of pressure boards 17 and 18 are provided, one each of which pressure boards is disposed between the central rib 15 and the annular flanges 19 and 20 formed at the sides of the drum 16. The drum 16 is revolubly supported on a shaft 21 carried by a frame 22 preferably provided with suitable rollers 23 for permitting relative movement of the primary molder 5 and the secondary molder 14. The shaft 21 carries a sprocket 24 about which extends a sprocket chain 25. The frame 22 also carries an idler sprocket 26 about which the chain 25 extends. The frame 22 carries a pair of hingedly mounted arms 27 provided with slots 28 for the reception of a cross bar 29 carried by the molder 5. A pair of bars 30 carried by the frame 22 are pivotally connected, each with an arm 27, and have their upper ends connected to the slotted ends of the arms 27 by pivotally mounted links 31. A cross bar 32 connects the arms 27 and supports an upwardly extending bracket 33. The upper portion of the bracket carries a support panel or board 34 over which panel or board pass belts 35 and 36 that receive the severed portions of the roll of dough from the molder 5 and carry same to the individual molders. It will be observed that the belts 35 and 36 carry the severed portions of the roll of dough to the center of the drum 16 intermediate the rib 15 and flange 20 and intermediate the rib 15 and flange 19 respectively. By this method the individual masses of dough are molded from their respective centers toward their outer ends. The links 31 carry the transversely extending shafts 37 and 38, each of which shafts carries a sprocket wheel, about which sprockets the chain 25 extends.

It will be observed that the shaft 37 is disposed substantially vertically above the shaft 38, consequently the chain 25 in passing about the sprocket 39 carried by the shaft 37, and about the sprocket 40 mounted on the shaft 38, assumes a substantially S-shape. The drum 7 of the primary molder 5 is rotatably actuated from the shaft 41. The shaft 41 carries a sprocket 42 about which the chain 25 extends. From the foregoing, it will be apparent that the auxiliary molder 14 may be attached to and detached from the primary molder at will and when used in conjunction with the primary molder it may be driven from the primary molder and does not require any additional power means for its operation. The cross bar 32 has mounted on it roller brackets 43 carrying rollers 44 that bear upon the outer surface of the belt 35 as the belt passes from the auxiliary molder to the primary molder. The structures provided for both the belts 35 and 36 are similar in this respect. The belt 35 extends about a roller 45 mounted on the shaft 38 and about a roller 46 mounted on stud shaft 47 carried by the bracket 48 mounted upon the frame 22 of the auxiliary molder. The axis of the roller 46 is oblique to the axis of the secondary molder. A bracket 480 mounted on a fixed stud shaft 47 carries a roller 49 that bears upon the under surface of the belt 35 as the belt passes from the roller 46 to the roller 44. Any suitable conventional means may be employed for permitting adjustment of the rollers 44 and 49 relatively to one another and to the belt 35 for tensioning the belt 35. A similar structure is provided for the belt 36. The shaft 37 carries baffle rolls 50, said rolls being disposed above the belts 35 and 36 and form pockets into which the severed sections of dough are discharged after passing over the upper end of the pressure board and from which pockets the sections are carried by belts 35 and 36. The baffle rolls serve also to preclude the severed portions of dough from rolling or falling out of said pockets wherefore any momentum imparted to the severed sections of dough as a result of said sections dropping as they pass beyond the pressure board is checked wherefore said severed sections would assume a substantially stationary position upon and relative to the belts 35 and 36 for carriage to the auxiliary molder.

Although individual support panels or boards 34 are shown for each of the belts 35 and 36, a single support board may be employed if so desired.

The cutting disc 11 is mounted on the shaft 51, which shaft is supported by a block 52 adjustably mounted upon brackets 53 revolubly mounted upon shafts 37 and 38. The shaft 51 is driven from shaft 38 by a sprocket chain 54 extending about a sprocket 55 carried by the shaft 51 and about a sprocket 56 carried by the shaft 38.

Suitable flouring means 550 may be provided for sifting flour on the drums of the primary and the auxiliary molders.

In the operation of my device dough is deposited in the primary molder 5 as is common practice in the art. The dough moves between the drum and the pressure board and is carried to and past the cutter 11, said cutter severing the mass of dough whereupon the severed portions of dough pass upwardly beyond the upper edge of the pressure board and fall into the pockets formed at the receiving ends of the belts 35 and 36. The severed dough sections then pass from said pockets and are carried by the belts 35 and 36 to the individual pressure devices provided in the secondary molder on opposite sides of the central annular rib 15. As the lumps of dough are carried between the molding devices the support panels or boards support the dough. After the individual severed dough sections have passed through the auxiliary molder they are discharged from above the pressure boards 17 and 18 upon a suitable receiving tray 500 carried by the auxiliary molder, from whence they are removed by any suitable means or agency.

It is to be noted that by employing devices embodying my invention, the production may be doubled and that by passing the severed dough portions through the secondary molder the bleeding ends of the severed dough portions are sealed, the advantages whereof are well known in the art.

What I claim is:

1. In a device of the class described the combination of a primary molder comprising a rotatable drum and a slotted pressure board extending about said drum, the slot therein being at one end of said pressure board, a revolving disc cutter extending through the slot in the pressure board for severing into sections a mass of dough passing between the drum and the pressure board, conveyor means each to receive a severed section of dough, an auxiliary molder comprising a plurality of molding devices, the conveyors being adapted to carry the severed dough sections to the center of the individual molding devices of the secondary molder, whereby each individual severed section of dough is molded from its respective center toward its ends.

2. In a device of the class described the combination of a primary molder comprising a rotatable drum and a slotted pressure board extending about said drum, the slot therein being at one end of said pressure board, a revolving disc cutter extending through the slot in the pressure board for severing into sections a mass of dough passing between the drum and the pressure board, conveyor means each to receive a severed section of dough, an auxiliary molder comprising a plurality of molding devices, the conveyors being adapted to carry the severed dough sections to the center of the individual molding devices of the secondary molder, whereby each individual severed section of dough is molded from its respective center towards its ends, and means for operating the secondary molder devices from the primary molder.

3. In a device of the class described the combination of a primary molder comprising a rotatable drum and a slotted pressure board extending about said drum, a revoluble disc cutter extending through the slot in the pressure board for severing into sections a mass of dough passing between the drum and the pressure board, an auxiliary molder comprising a plurality of individual molding devices and a frame, a pair of arms pivotally mounted on the frame having slots formed in one end, a bar carried by the primary molder for receiving the slotted ends of the arms. a pair of bars having one end pivotally mounted upon the frame, a pair of links having one end mounted on the free ends of the bars and the other end mounted on the arms, baffle rolls carried by and extending between the links for directing the severed sections of dough from the primary molder onto the conveying means, the said conveying means depositing the said sections of the dough into the individual molding devices of the secondary molder.

4. In a device of the class described the combination of a primary molder comprising a rotatable drum having a slotted pressure board extending about said drum, a revoluble disc cutter extending through the slot for severing into sections a mass of dough passing between the drum and the pressure board, a secondary molder, means for retaining the primary and secondary molder in spaced relation, links mounted on the spacing means for carrying baffle rolls and a drum adjacent the primary molder, brackets mounted on the secondary molder carrying a second drum, an endless conveyor belt extending about the drums, the baffle roll being utilized for directing the severed sections of the dough from the primary molder onto the conveyor belt from which the severed sections of dough are deposited into the individual molding devices of the secondary molder.

5. In a device of the class described the combination of a primary molder comprising a rotatable drum and a slotted pressure board extending about said drum, a revoluble disc cutter extending through the slot in the pressure board for severing into sections a mass of dough, an auxiliary molder comprising a plurality of individual molding devices, a pair of arms for retaining the primary and secondary molder in a spaced relation, a tie-rod extending between the arms, a bracket having one end mounted on the tie-rod and carrying a panel on the other end, the panel and brackets serving as a support for an endless conveyor belt extending between the primary and secondary molder, the conveyor belt receiving the severed sections of dough from the primary molder and depositing them in the center of the individual molding devices of the secondary molder.

6. In a device of the class described the combination of a primary molder comprising a rotatable drum and a slotted pressure board extending about said drum, a revoluble disc extending through the slot for severing into sections a mass of dough passing between the pressure board and the drum, an auxiliary molder comprising a plurality of individual molding devices, means for retaining the molders in spaced relation, a tie-rod mounted on the spacing means, links mounted on the spacing means for carrying a pair of drums adjacent the primary molder the axes of which are parallel to the axis of the primary molder, brackets carried by the secondary molder, a second pair of drums carried by the brackets, the axes of which are oblique to one another and oblique to the axis of the secondary molder, a pair of endless belts extending about the drums, the belts diverging from the center of the primary molder as they approach the secondary molder, and a bracket carrying a compensating roller at its upper end mounted upon the tie-rod, the compensating roller taking up slack developed in the endless belts.

7. The combination of spaced molders, each capable of individual use, one of said molders comprising means for operation on and discharge of single lumps of dough and the second molder comprising means for simultaneously receiving, a plurality of lumps of dough and for simultaneously molding a plurality of lumps of dough, means including conveyor means for detachably connecting the two molders and for transferring dough from the first molder to the second molder, and means carried by the detachable connection means for severing lumps of dough discharged by the first molder into a plurality of lumps and directing individual severed lumps to the conveyor means for distribution of such severed lumps to individual molding means of the second molder.

8. A device for attachment to a multiple molder and detachably connectible to a second molder and comprising a frame, moving conveyor means thereon, a severing means for dividing molded lumps of dough from second molder and directing the divided parts of such lumps to the conveyor means for transmission to the multiple molder and power transmission means operable by one of the molders and serving to synchronously actuate the severing means, the conveyor means and the other of said molders.

In testimony whereof I have hereunto subscribed my name this 26th day of August, 1925.

GEORGE A. VAUGHN.